(12) United States Patent
Garfinkel

(10) Patent No.: US 6,330,317 B1
(45) Date of Patent: Dec. 11, 2001

(54) CALL BLOCKING SYSTEM

(76) Inventor: Dean Garfinkel, 255 Piping Rock Rd., Old Brookville, NY (US) 11545

( * ) Notice: Subject to any disclaimer, the term of this patent is extended or adjusted under 35 U.S.C. 154(b) by 0 days.

(21) Appl. No.: 09/435,955

(22) Filed: Nov. 9, 1999

(51) Int. Cl.[7] .................. H04M 1/663; H04M 1/665; H04M 1/677
(52) U.S. Cl. .................. 379/196; 379/197; 379/900
(58) Field of Search .................. 379/188, 196, 379/197, 198, 199, 200, 900

(56) References Cited

U.S. PATENT DOCUMENTS

| | | | |
|---|---|---|---|
| 3,920,936 | 11/1975 | Mogtader | 379/131 |
| 4,188,508 | 2/1980 | Rogers et al. | 379/189 |
| 4,336,422 | 6/1982 | Mellon | 379/189 |
| 4,346,264 | 8/1982 | Sharvit | 379/198 |
| 4,358,640 | 11/1982 | Murray | 379/200 |
| 4,482,787 | 11/1984 | Sagara et al. | 379/200 |
| 4,612,419 | 9/1986 | Smith | 379/200 |
| 4,794,642 | 12/1988 | Arbabzadah et al. | 379/200 |
| 4,866,762 | 9/1989 | Pintar | 379/200 |
| 4,993,062 | 2/1991 | Dula et al. | 379/88.27 |
| 5,161,181 | 11/1992 | Zwick | 379/88.2 |
| 5,200,995 | 4/1993 | Gaukel et al. | 379/200 |
| 5,553,128 | 9/1996 | Grimes | 379/211 |
| 5,737,403 | 4/1998 | Zave | 379/201 |
| 5,751,800 | 5/1998 | Ardon | 379/134 |
| 6,000,031 | * 12/1999 | Bingamen et al. | 379/88.12 X |
| 6,130,937 | * 10/2000 | Fotta | 379/200 |

* cited by examiner

*Primary Examiner*—Harry S. Hong

(57) ABSTRACT

The integration of various federally required and state mandated do-not-call lists for telemarketers into a system that automatically blocks outgoing calls from a number of companies ("Customer Companies") taking into account factors such as preexisting customers which may legally be contacted is disclosed. The system reviews outgoing calls by a telemarketer, compares it to the general do-not-call lists and the specific customer company do-not-call list and override permitted call list to make a determination if the call should be completed. This integration is due to the incorporation of a general purpose computer in a central location that is connected to all the major telephone carriers switch cluster locations and operated by a service provider. The "do-not-call" database of originating/destination pairs, as well as the logic for blocking or permitting telephone calls, is stored in this computer. This computer makes all blocking decisions in real-time based on the originating and destination number combinations of the call.

10 Claims, 6 Drawing Sheets

CALL BLOCKING SYSTEM

BACKGROUND OF THE INVENTION

1. Field of the Invention

The invention concerns telephone systems generally and more specifically, concerns the blocking of outgoing phone calls to phone numbers which have been placed on a do-not-call list.

2. Prior Art

In recent years the door to door salesman has been replaced by telephone solicitation. Rather than a salesman walking a route, a telemarketer makes a series of telephone calls. The telephone numbers dialed are normally on a call list given to the telemarketing salesman by his employer. The call list may be organized by address, consumer information or by the numbers themselves. Just as the consumer can slam the door in the face of a door to door salesman, the consumer may hang up upon receiving a telephone solicitation. However, the call itself is considered by many to be an intrusive act. The widespread nature of telephone solicitation means that certain segments of the public are desirous of being protected from even receiving such calls. Thus, a number of private organizations were created to inform direct marketers as to those who did not wish to receive such phone calls. Organizations produced do-not-call lists from those who do not wish to receive telemarketing solicitations and provided such lists to those direct marketeers who voluntarily comply with the consumer's request. Upon receipt of these lists, these marketeers would delete the listed numbers from their telemarketer's call lists. Such do not call lists work both to the benefit of the people who do not wish to receive calls and to the soliciting company which has its call list referred to a more select group of potential consumers that are more receptive of telephone sales pitches.

The Federal Government requires each telemarketer to maintain its own "do-not-call" lists and to add to the list the name of anyone so requesting exclusion from telephone calls from their company. Under the statute, fines can be assessed against companies that call numbers on the company's do-not-call list. The consumer is given the right to sue any company which calls them after they have requested that the company place them on the do-not-call list. In addition, a number of state governments, including those of Florida, Oregon, Arizona, Alaska, Kentucky, Tennessee, Alabama, Arkansas and Georgia, maintain, or in the near future, will be maintaining, statewide do-not-call lists which are applicable to all vendors calling numbers in the state.

Thus, a telemarketer is faced with a legal responsibility under federal and state law to refrain from calling numbers maintained on separate lists including their own internal list and lists maintained by a number of state governments. On penalty of fine and civil action, the responsibility is laid on the telemarketer to ensure that no do-not-call numbers are, in fact, called. In addition, they may have one or more organizations do-not-call list with which the telemarketer wishes to comply. Accordingly, companies developed their final call lists for their telemarketer by comparing and matching their federally required do-not-call list, various state do-not-call lists and organizational do-not-call lists with their telemarketer's call lists and eliminating any matching numbers from their call list. This process has until now been done manually and is subject to human error. There is a large number of employees who must be committed to this effort. Even with this effort, the process does not eliminate the possibility of an employee innocently calling a number from an old call list or an employee simply disregarding the company's do-not-call list altogether in the search for commissions.

In addition, certain ambiguities develop in use. For example, a prior purchaser may have placed his name on a state mandated list. The hand process would eliminate that number although the customer may, in fact, wish to receive the call and by his former purchases, is a permitted callee under the state law.

Various attempts have been made to control out-going calls, usually to restrict long distance toll calls or to a single list of restricted numbers. A number of systems have been directed to stopping the making of long distance calls or specific area calls from a given location. For example, U.S. Pat. No. 4,612,419, to Smith, entitled Toll Restriction Circuit for Electronic Telephone Station, describes a means controlling toll calls only and is employed within the telephone station itself. It looks for a 0 and 1 in the first dialed digit, the subscriber can lock and unlock the device by a key pad entry with an enabling and disabling code. U.S. Pat. No. 4,358,640, to Murray, entitled Telephone Security Device, issued Nov. 9, 1982, describes a circuit which has means to allow or disallow toll calls on entry of a programmable code stored. U.S. Pat. No. 4,794,642, to Arbabzadah et al., Call Screening in a Public Telephone Station, issued Dec. 27, 1988, discloses control equipment in a customer owned public telephone station which prevents a user from making unauthorized telephone calls in a telephone system. The system restricts telephone numbers a user can dial to those numbers preselected by a station owner. U.S. Pat. No. 5,200,995, to Gaukel et al., issued Apr. 6, 1993, entitled Universal Outgoing Call Restriction Circuit, discloses a circuit which prevents a telephone or a plurality of telephones from making unauthorized or restricted calls to specific numbers or unspecific groups of numbers. Essentially the system compares the numbers against preprogrammed internal lists of restricted numbers.

None of these patents disclose a system necessary to handle the blocking requirements under federal and state law and lists prepared by various blocking organizations.

SUMMARY OF THE INVENTION

A system which would monitor and quickly update all such lists for a number of companies would be beneficial to both the consumers who wish to be protected from telephone solicitation and the soliciting companies. Such a system would have to be able to block or specifically permit calls from specific originating numbers to specific destination numbers. To be useful, the do-not-call decision would have to be fully automatic and include the capability of dynamically changing the do-not-call list for specific originating/destination phone number pairs as individuals request blocking or become clients of the company in question. Each calling company must be capable of adding or deleting numbers from the company's specific do-not-call list without affecting another company's list. Equally, each company must have the option of automatically blocking numbers on the state mandated list or to block only from their own do-not-call list. Equally such a system must be capable of supporting a single company specific do-not-call list for multiple offices of the same company in different geographic locations. Finally, it must be able to import, in bulk, large numbers of specific telephone number combinations.

The present invention is directed to integration of various do-not-call lists into a system that automatically blocks outgoing calls from a number of companies ("Customer Companies") taking into account factors such as preexisting customers which may legally be contacted. Thus, rather than modifying the call lists for each customer company, it acts to review the outgoing call, compare it to the general do-not-call lists and the specific customer company do-not-call list and override permitted call list to make a determination if the call should be completed. This integration is due to the incorporation of a general purpose computer in a central location that is connected to all the major telephone carriers switch cluster locations and operated by a service provider. The "do-not-call" database of originating/destination pairs, as well as the logic for blocking or permitting telephone calls, is stored in this central computer. This computer makes all blocking decisions in real-time based on the originating and destination number combinations of the call.

All participating customer companies have access to a separate part of this database ("updating do-not-call database") for the purpose of adding or deleting numbers on their company specific do-not-call lists or to permit override of specific numbers on any state mandated or organizational do-not-call lists. Since this database receives information from various companies and from a number of state and organizational do-not-call lists, it must be accessible from different geographical locations. Accordingly, the database is maintained using the Internet. The Internet acts as a customer interface that will permit any customer who has access to the Internet to enter change requests for specific do-not-call lists.

Under normal telephone practice when a call is originated, the information for the call is transported to the primary switch cluster for the telecommunications carrier. This information includes both the originating number, or where the caller has a trunk line, the AuthCode (a seven digit number corresponding to the originating trunk group of the caller) and the called number("originating/destination pair"). If the caller is from a participating customer company on the present do-not-call blocking system, the switch cluster recognizes the originating number or authorization code and the originating/destination pair information is transported from the switch cluster to the control computer while the call is held at the switch cluster. The control computer's function is to then process the information and create a command to either block that call or permit the call to be completed. Once the decision is made, the control computer indicates the decision to the carrier's switch cluster and a command is implemented at the switch cluster to either allow the call to be completed or to return a message to the telemarketer indicating that it has been blocked under the call blocking system.

BRIEF DESCRIPTION OF THE DRAWINGS

The invention can be more fully understood from consideration of the following detailed description of an illustrative embodiment of the invention and the accompanying drawings in which.

DETAILED DESCRIPTION OF THE PREFERRED EMBODIMENTS

The present invention encompasses not only the specific method of blocking the telephone calls but of maintaining and updating the do-not-call database and its component lists both in general and for specific customer companies. In particular the invention includes the periodic synchronizing of the do-not-call databases with a master updating database which is periodically updated by customers through the internet and by state and consumer organizations latest do-not-call lists.

Figure 1:
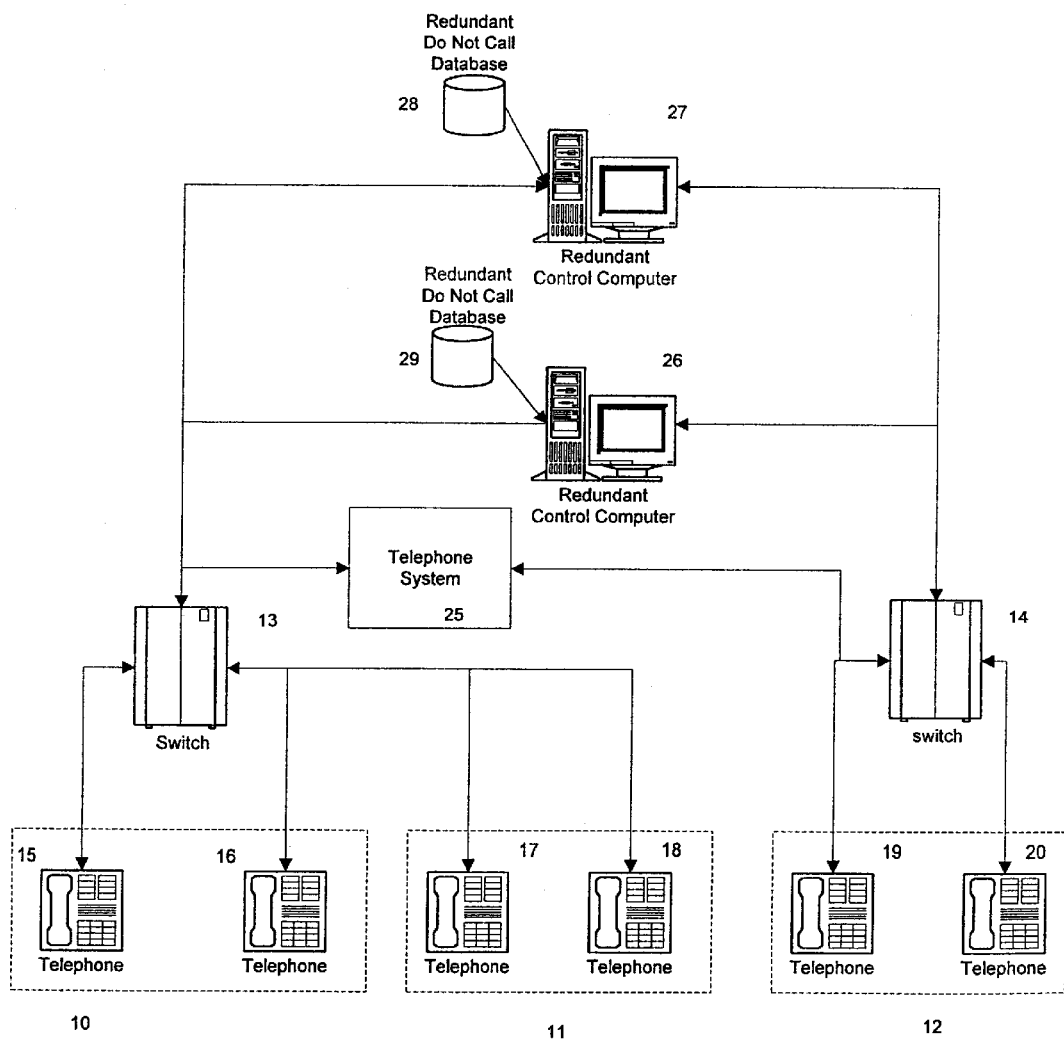
FIG. 1 is a diagrammatic representation of the components of the control system.

FIG. 1 is a diagrammatic representation of how the control computer of the present invention interconnects with the normal telephone system. Telemarketing customer companies 10–12 receive their telephone services from one or more telephone companies or carriers. The customer companies 10–12 are connected to its own telecommunications company provider by conventional means such as plain old telephone service lines (POTS), T1 line, feature D, or any other conventional telephonic linkage. The telecommunications company provides a dial tone to the customer for a telephone call and performs all normal communication functions. Calls are placed from hand sets 15–20 at the respective customers 10–12 to their local primary telephone switch cluster 13–14.

As seen in FIG. 1, customer companies 10 and 11 have their telephone service provided through the same primary switch cluster 13. Customer company 12, has its telephone service provided through primary switch cluster 14. As is normal with any telephone call, when a call is placed from handsets 15–19 information both as to the originating number of the hand set and the destination number which was dialed by the customer company (i.e., the originating/destination pair) is supplied to the switch cluster 13–14. In normal operation, the primary switch cluster 13 and 14 would then route the signal to the destination number dialed at the respective telemarketer's hand sets 15–20 through the telephone system 25. In the present system, the switch cluster 13–14 determines from the originating number or AuthCode whether the call is to be reviewed for a do not call determination. If the originating number is one of the numbers from which calls are to be reviewed, the switch cluster 13–14 holds the call and forwards the originating destination pair to a control computer 26–27 for a determination of whether the call should be made or blocked by reference to their respective databases either stored on that computer 26–27 or in separate storage means 28–29.

In actuality, there may be two or more redundant control computers 26–27 performing the function. While each such computer will be designed to handle the complete load of anticipated call traffic, the traffic load may be divided evenly between the redundant computers 26–27. Thus, if one of the control computers 26 cannot handle a call routed to it for any reason, one of the alternative control computers 27 can automatically take over. Although shown as two computers in FIG. 1, a number of such redundant computers may be used and, in fact, such control computers may be geographically distributed throughout the country, creating a system with multiplex redundancies and, therefore, extremely high reliability. Geographic distribution also makes this system more easily adapted to handle numerous wide-spread offices of a single company in a uniform manner. Of course, the do not call database 28–29 for each of the redundant computers would have duplicate information and their updating be improved so that each blocking computer 26–27 would respond in the same way in making a call blocking decision.

Figure 2:
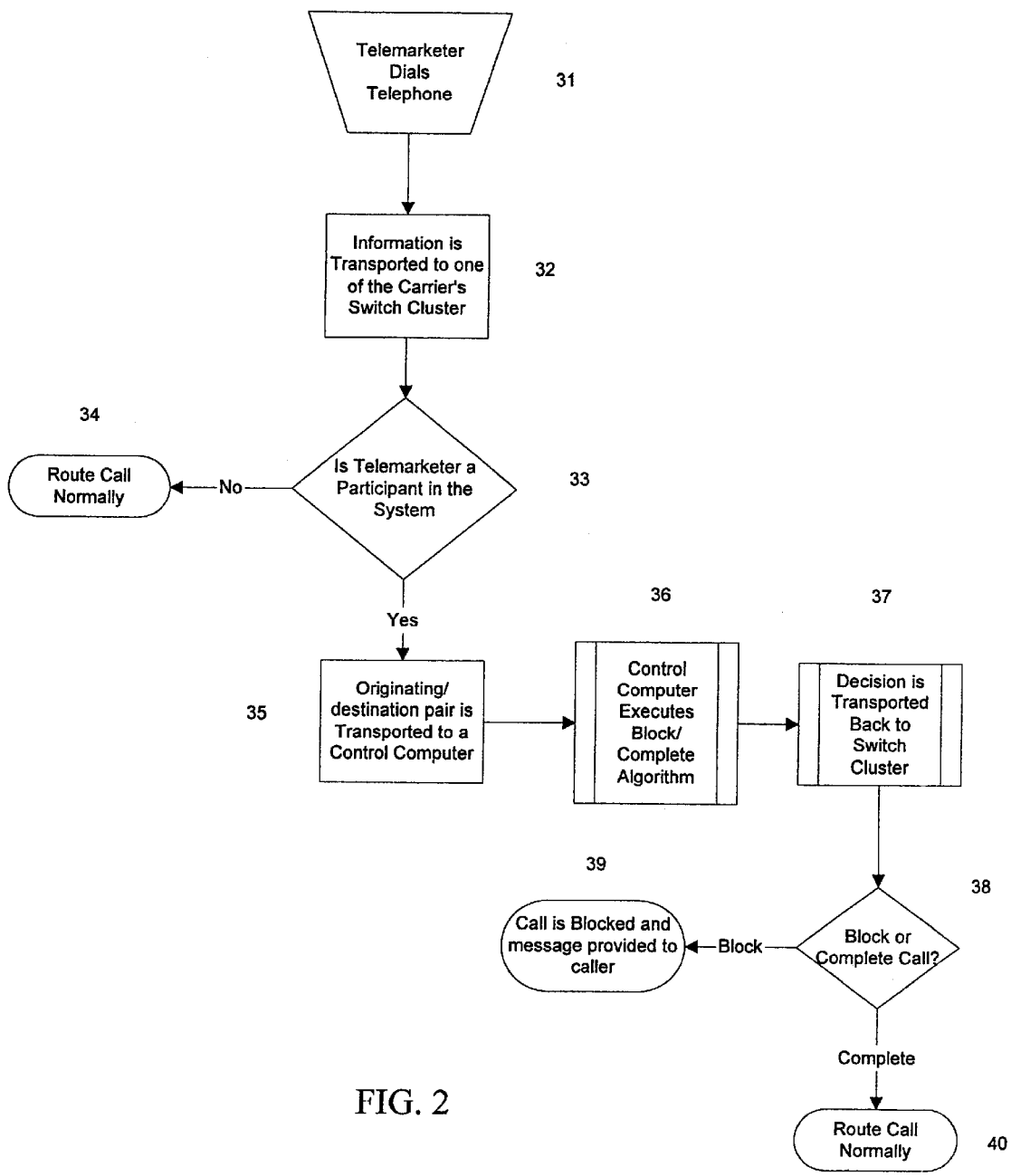
FIG. 2 is a flow diagram showing the overall call block processing.

FIG. 2 is a flow diagram showing the process for blocking an individual telephone call. The telemarketer of a customer company 10–12 dials his handset 15–20 in a conventional manner 31. As normal in modem telecommunications, by so dialing the handset 15–20, the customer company 10–13 originates a signal corresponding both to the dialer's originating telephone number or where the handset is on a private trunk line, its AuthCode, and the destination number, i.e., the originating/destination pair. This information is transported in the normal manner 32 to the telemarketer's telecommunication company's carrier's primary switch cluster 13–14. At the cluster, the switch 13–14 determines if the call originates from a handset 15–20 which is subject to call blocking 33. If not, the call is then automatically routed normally 34 to the destination telephone number. However, when the call originates from a telephone handset 15–16 which is subject to blocking, the call is so recognized by the primary switch cluster 13–14, the call is held at the switch cluster 13–14 and the originating/destination pair information is transported 35 to one of the control computers 26–27. The control computer 26–27 then determines whether the calls should be permitted or blocked by execution of a block/complete algorithm 36 as more fully discussed below. Upon making the appropriate determination, the control computer 26–27 transports the decision 37 to the switch cluster 13–14. Depending upon this determination 38, either the call is blocked 39 and a message is forwarded to the telemarketer 40 indicating that the call has been blocked or is routed normally 40. The entire decision making process is very rapid. It is unlikely that a telemarketer will notice any delay in placing the call.

Figure 3:
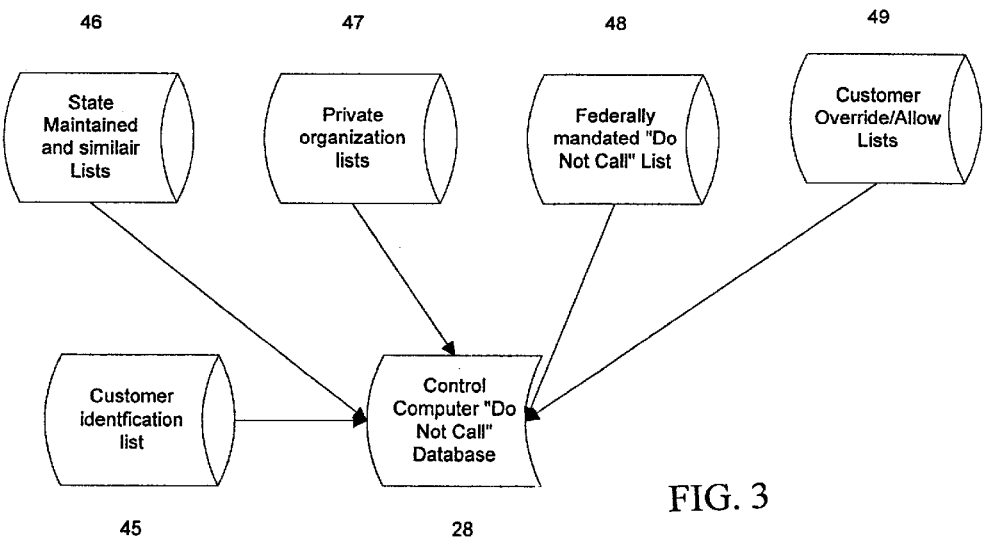
FIG. 3 is a diagrammatic representation of the various elements forming the control computer do-not-call database.

The block/complete algorithm used to make the block decision 36 is based on the information in the redundant do not call databases 28–29. As seen most clearly in FIG. 3 each redundant database 28–29 consists of a number of component lists 45–49. The database 28–29 is structured around the customer identification list 45. This list is composed of an identification code or number ("CN") for each customer and the telephone numbers and/or AuthCodes corresponding to each customer. All originating telephone numbers and AuthCodes are tagged with the customer's CN. All offices of a single company have a single CN. List 45 entries may also contain one or more flags called private organization or PO flags that determines whether or not a customer has chosen to be blocked from calling the numbers on one or more private organization maintained lists. If the value of a PO flag is false, the customer has chosen not to be blocked by that private organization's do-not-call list. List 45 allows the control computer to select the relevant information from lists 48–49 and determine whether to use list 47.

List 46 is a composite list of all the state generated lists from all relevant states. To this list may be added individuals who have requested the service provider to be so protected. The resulting list may be sorted by area code and number.

Since the state mandated lists are for all telemarketing done within the state regardless of the source, they are not tagged for, or associated with, individual customers. Similar do-not-call lists are maintained by private organizations are not customer company specific 47. Such lists are for all telemarketers and are thus not tagged by customer companies. List 48 is the federally required do-not-call list which must be maintained by each telemarketer. This list is a compilation of all those individuals who, when called by a customer company 10–13, indicated that they wished no further calls. Since each such list is peculiar to the customer company, it is tagged with the customer company's CN. The final list 49 forming each redundant database 28–29 is the customer company's override/allow lists. The customer company may have established relations with one or more individuals who, while unwilling to accept telemarketing calls in general, are willing to accept telemarketing calls from this particular customer company. This list contains all such numbers for a customer company and is tagged with the customer company's CN to permit calls to such persons 53 by the allowed customer company.

Figure 4:
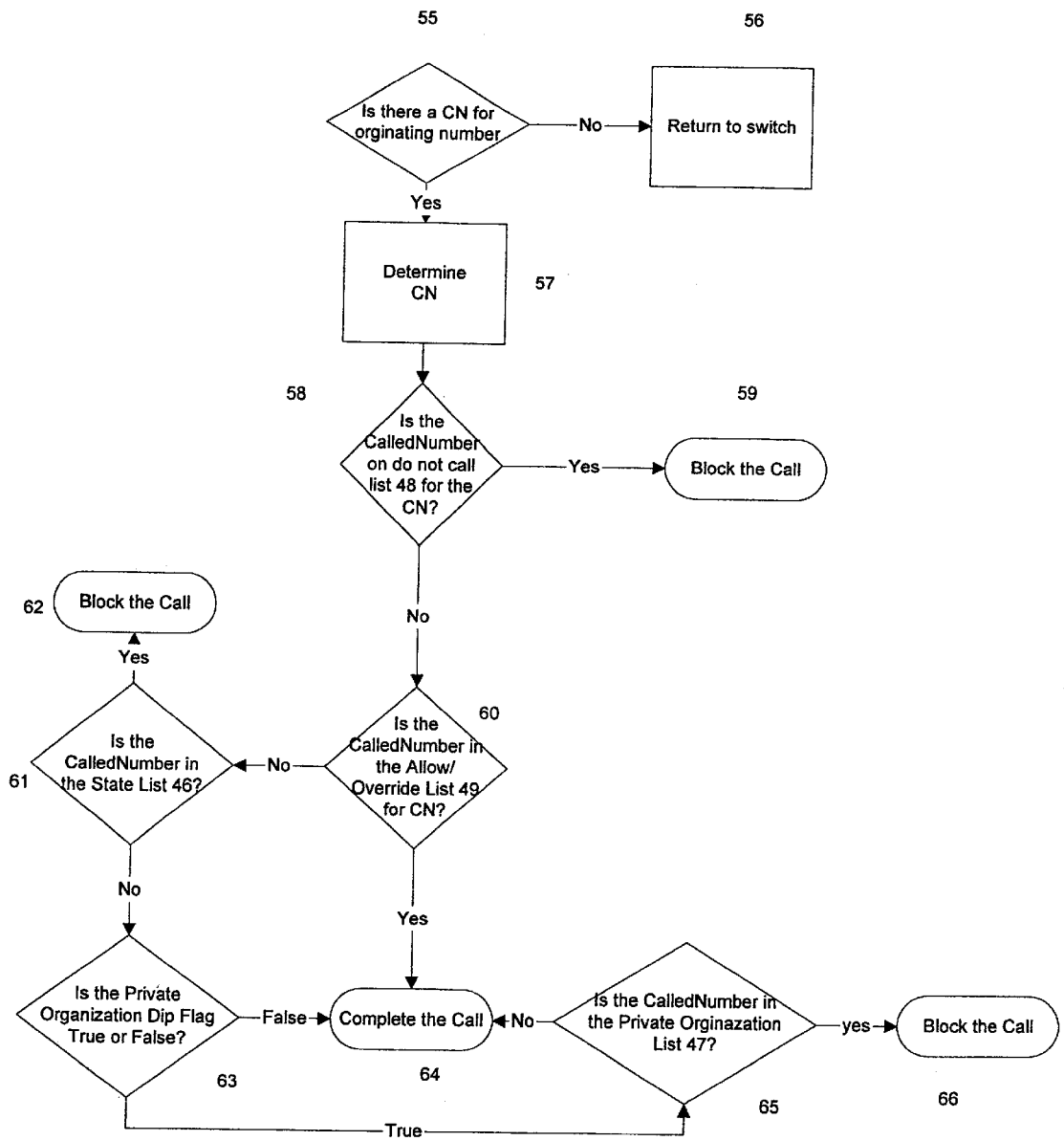
FIG. 4 is a flow diagram of decision making process performed by the control computer.
Figure 6:
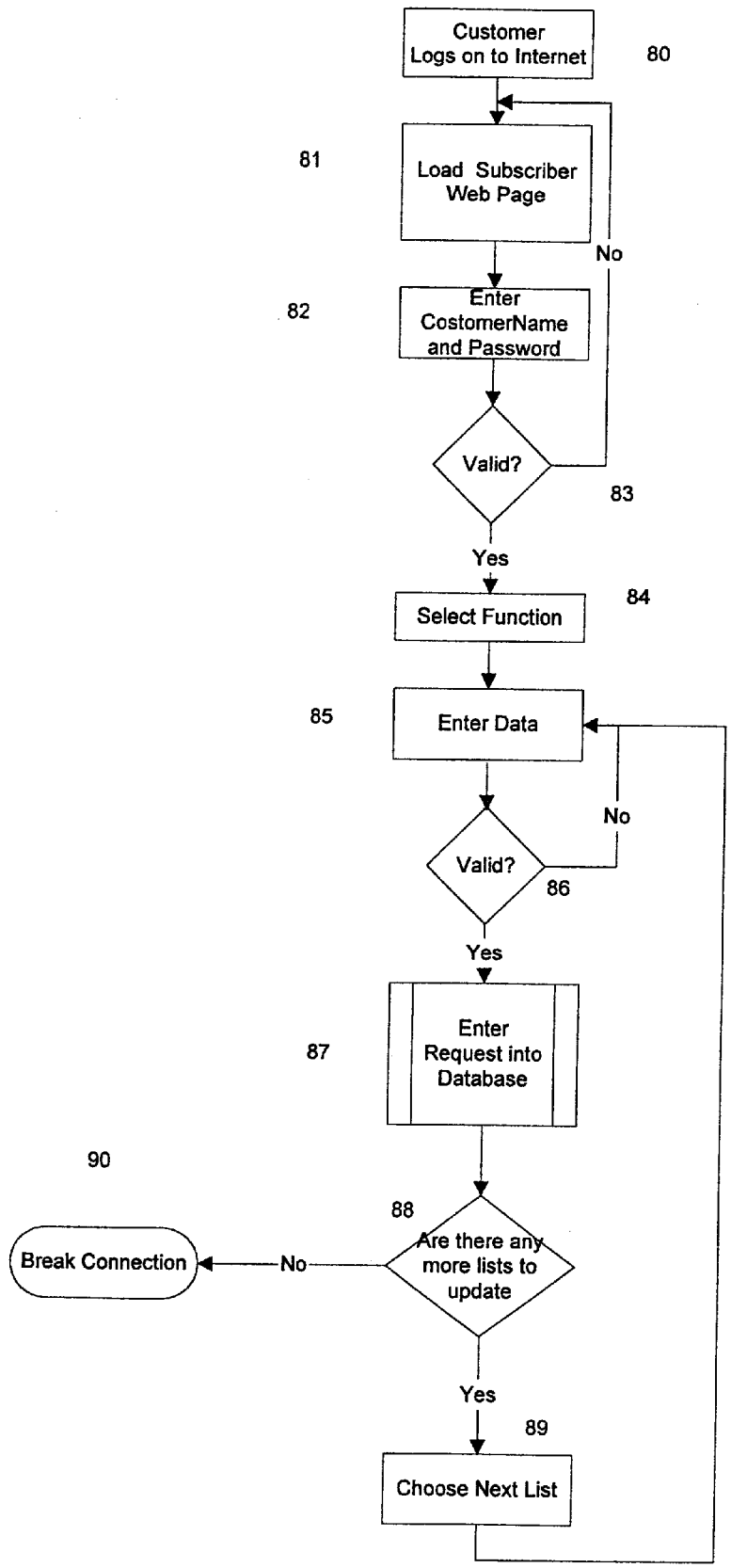
FIG. 6 is a flow diagram of data entry to the customer's do-not-call database by the Internet.

FIG. 4 is a flow diagram showing the process for carrying out the Block/Complete Algorithm. When an originating/destination pair arrive at the control computer for review, it is first compared 55 with the customer list 45 to confirm that the originating number is that of a customer company. If it is not, the call is completed 56. If, however, it is on the customer identification list 45, the CN for the originating number is determined and used in obtaining the appropriate information from lists 48 and 49.

The called number is then compared 58 to the federally required do-not-call list 48. As previously noted, this do-not-call list is tagged with the customer company's CN. If the called number is on the federally required do-not-call list for that customer company, the call is blocked 59. If, on the other hand, the called number is not on the federally required list 48 for the customer company, i.e., the number is either not on the list or it is not called with the CN of the calling customer company. If the same number is to be blocked for two different customer companies, the number appears twice on the do-not-call list 48, each time with a different tag. The number is then compared 60 to the allowed/override list 49 for the particular customer company as indicated by the CN tag in the allow/override list 49. If the number is on the allow/override list 49, the call is completed 64. If it is not on the allow/override list 49, the call number is then compared 61 to the state mandated list 46. If the call number is on the state mandated list 46, the call is then blocked 62. If it is not on the state mandated list 46, the programs determines whether the private organization dip flag is at true or false 63. If it is false, and thus the customer does not with to adhere to the private organization's requested blocking, the call is completed 64. If, on the other hand, the private organization dip flag is true and, thus, the customer wishes to conform to the request of the private organization, the call number is then compared 65 to the private organization list 47. If it is not on the private organization list 47, the call is completed 64. If, on the other hand, it is on the private organization list 47, the call is blocked.

Obviously, the contents of the do-not-call database 26–29 must be updated as the underlying information changes. At present, except for Alaska, the states issue new state mandated databases quarterly. The federally required do-no-call list 48 changes daily as people indicate they do not desire a customer company to call them again. The private organization lists 47 are periodically updated, as are allow/override lists. New customer companies are added to the system. All these changes require that the customer identification list 45, the federally required do-not-call list 48 and the customer override/allow list 49 be updated accordingly. In order to keep the redundant do-not-call databases 28 and 29 current, the databases are updated daily with information received from the customers and as received with regard to information such as state mandated lists of do-not-call numbers.

Figure 5:
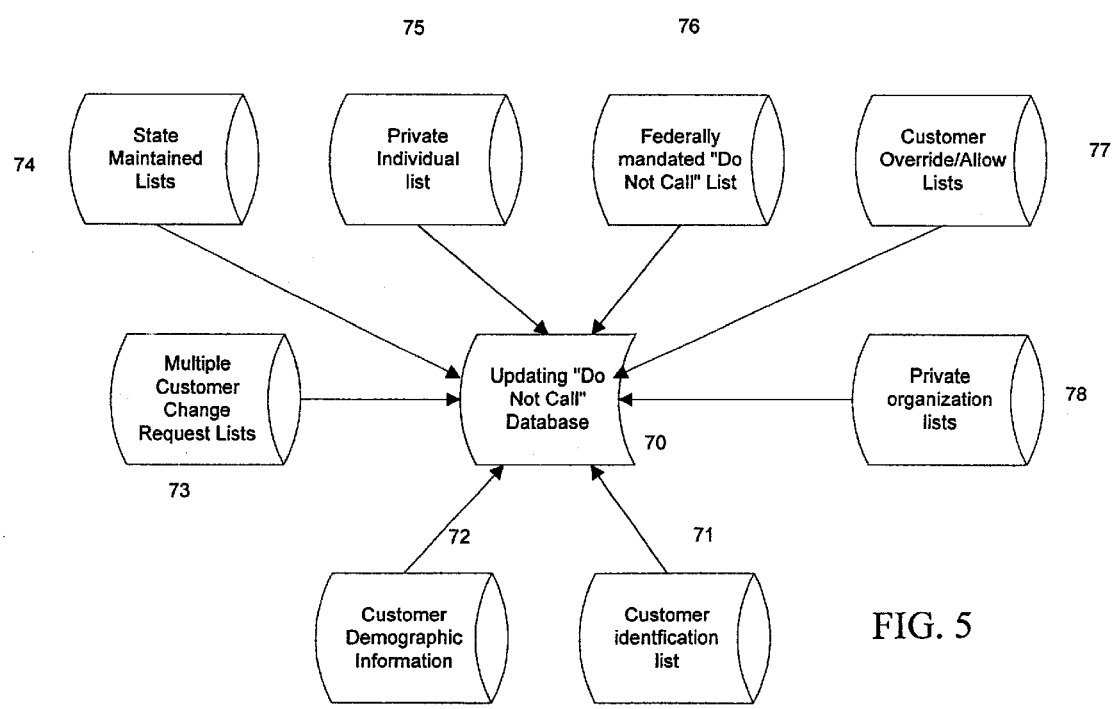
FIG. 5 is a diagrammatic representation of the components of the system to update the do-not-call database.

In order to accomplish this result, a separate updating do-not-call database 70 is maintained on an updating computer (not shown) maintained by the service provider. As seen in FIG. 5, the updating do-not-call database 70 is composed of a number of lists which are periodically updated as new information becomes available. One of the component lists is the customer identification list 71 corresponding to the customer identification list 45 contained on the control computer do-not-call database 28. In normal operation, new customer companies are added and customer companies leave the service. Equally, existing customer companies may change telephone service, adding or subtracting telephone numbers or AuthCodes for the service. As such changes occur, they are inputted into the customer identification list 71 by the service provider to produce an updated list of telephone numbers and AuthCodes tagged with the appropriate CN. The updating do-not-call database may also contain customer demographic information 72, such as full corporate names, addresses, telephone numbers, billing information and the like associated with each CN for use of the service provider.

As each state mandated list is received by the service provider, the service provider updates list 74 to include any new numbers and make any other appropriate changes in the list 74. State mandated lists may be provided over the Internet or by CD-ROM disk, each state having its own unique protocols and software programs. Using such programs, the data may be converted to a common format for updating the state mandated lists 74.

As noted above, in the control computer do-not-call database 28, state mandated information is combined with the telephone numbers of individuals who have contacted the service provider and requested their name be placed on the list. This information is kept on a separate private individual list 75 which is combined with the state mandated list 74 to make up a single list in the control do-not-call database 28 during the transfer process of updating the control do-not-call base 28.

Similarly, throughout the business day, each customer company receives do-not-call requests from individuals. The customer company stores the changes and periodically modifies federally required do-not-call list 76 maintained in the updating database 70. List 76 is, in reality, a more current list of the federally required do-no-call list 48 forming part of do-not-call database 28. In a like manner, customer override/allow lists may change during the day as individuals, for example, request a call from the customer company and, thus, updating do-not-call database 70 maintains an updating customer override/allow list 77. This is a more current version of the information stored in the customer override/allow list 49 of the control computer do-not-call database 28. Finally, the private organizations periodically update their list and such updated lists are maintained on private organization list 78 of the updating do-not-call database. This list 78 is the current list corresponding to private organization list 47 on the control computer do-not-call database.

Since it is important for control purposes to keep track of the customer companies changes in the updating database, a list of requested changes 73 is maintained. This historical record is contained in tables that are not necessary for operation in the control computer but must be maintained to verify that the customer has requested these changes. When the customer requests an addition, a record is added to the change request table and to the requested table in this user-interface computer. The date of the add request is part of the data entered in the change request table but not in the requested table. After verification that the requested addition has been made to the appropriate table in the control computer, the change request record in the user-interface computer is updated with the date of this addition. When the customer requests a deletion, a record is added to the change request table; however, in this case, a record is deleted from the requested table. The date of the deletion request is part of the data entered in the change request table but not in the requested table. After verification that the requested deletion has been made to the appropriate table in the control computer, the change request record in the user-interface computer is updated with the date of this deletion. This enables the customer to determine, at any time, which changes have been requested in which customer lists. The customer can also determine which changes have been verified as being written in the control computer by looking at the date of the change. If the change has not occurred in the control computer, the date appears as blank; otherwise, the date of the verification of the change appears. Records in the change request tables are never deleted in order to maintain an audit trail of requested changes.

As noted above, the lists 71 through 78 forming the updating do-not-call database are updated in a number of different fashions depending on the nature of the information. Customer identification lists 71 are inputted directly in the updating computer by the service provider as would customer demographic information 72. Equally, state mandated lists are normally supplied by the state on CD-ROM in a number of different protocols each having their own associated software. Thus, in order to make a list 74 the service provider would normally have to use each of the separate types of software to transfer the information to a common format where such information would be integrated. Similarly, private individuals requesting the service provider place them on a do-not-call list would be inputted into its separate list 75 by the service provider which is then integrated in the control computer's database 28].

However, the federally required do-not-call list 76 and customer override/allow lists 77 are a product of the individual customer's business and are periodically changed during the day. It has been found that the best way for customer companies to forward information to the updating do-not-call database 70 is by means of the Internet.

Figure 7:
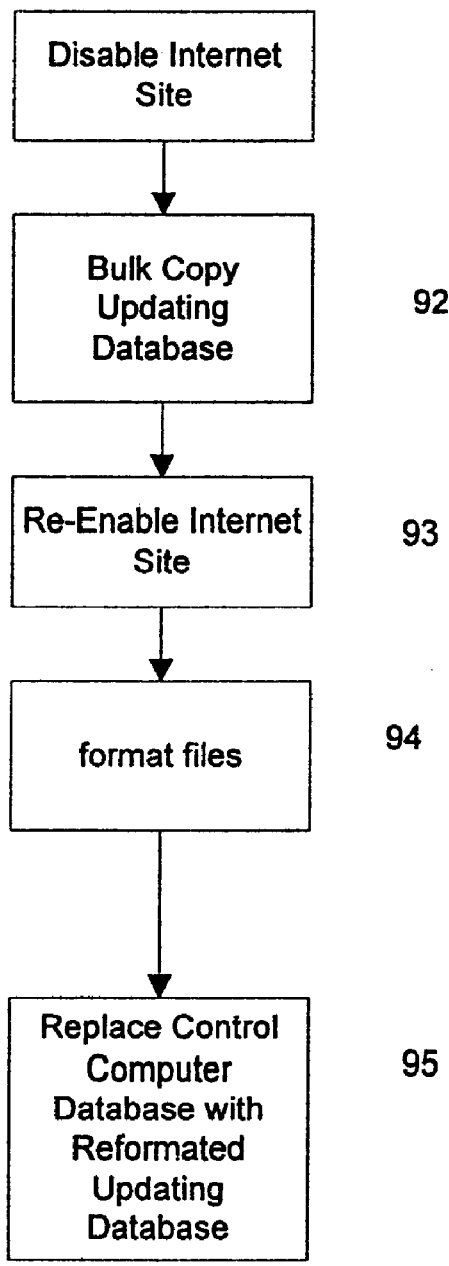
FIG. 7 is a flow diagram for transferring the updated database information to the control computers.

FIG. 7 is a flow diagram of the method used to upload information from individual customers for alteration of the federally required do-not-call list 76 and the customer override/allow list 77. A similar program can be used with connection of updating the private organization list 78 and other lists where appropriate.

Each customer is assigned a username and three passwords at initial set up. The passwords permit the customer to logon to the server and read data (logon/read password), add data to their "Do Not Call" or Add/Override lists (add password), and delete data from their "Do Not Call" or Add/Override lists (delete password). As seen in FIG. 7, to update the updating do-not-call database with the latest customer company information, the customer company logs on to the Internet 80 and loads the subscriber web page 81, enters the customer name and password 82.

Once the customer is accepted onto the system by entering his correct logon/read password, a page of options on a main menu is sent to the customer. This company-specific page shows the company name and other pertinent data to the customer. The data is read from the database by searching for the username and reading the customer's corresponding Customer Number (CN). The only data that the customer is permitted to see is that which is tagged by the CN that is associated with the company's username. If the customer enters a username or password that is not in the database, or does not correspond with each other in the database, an error page is sent to the customer and no data is displayed. The customer cannot obtain access to unauthorized data on any page because the CN retrieved from the database at logon is used to validate the customer's right to have the page loaded in his internet browser. The validation is in the form of a cookie that is placed on the customer's hard disk and lasts only for as long as the customer's session lasts. When the session ends, the cookie disappears. The customer must enter a valid password to have the cookie placed on his machine. If it is not the correct password the customer is brought back to the subscriber web page 81 and asked to enter his name and password 82 again.

The main menu displays options to add or delete numbers from the customer's "Do Not Call" list or from the customer's Add/Override list. There are also options to display or download any customer list. If the customer has entered a valid add password in addition to a valid username and read/logon password, requests to add a number to one of his lists will be permitted. If the customer has entered a valid delete password in addition to a valid username and read/logon password, requests to delete a number from one of his lists will be permitted. If it is the correct password, the customer is asked to select a list which it desires to update 84. The caller is then presented with an appropriate web page for entry of the data and so enters the data 85. Entry may be by hand, by forwarding a completed file or by other means. Then the data 85 is reviewed to see if it is in a valid format 86. If it is not in a valid format, the customer is sent back to reenter the data 85. If it is in a valid format, it is then entered 87 into the updating do-not-call database 70. The customer is then queried whether there are any more lists to update 88. If so, the customer picks the next list to update 89 and enters the appropriate data 85. If there are no further lists, the customer breaks the Internet connection 90. The updating do-not-call database is periodically transferred to all control computer do-not-call databases, usually once a day at a time traffic would be at a minimum.

FIG. 8 is a flow diagram in the process of updating the control computer do-not-call database by the information contained in the updating do-not-call database 90. First, the Internet site for receiving updating information from the customers is closed 91. The information in the updating database 70 is then bulk copied for transfer 92 and the Internet site is reestablished to allow inputting of data for the next updating cycle 93. The files are then formatted 94 to correspond to the control computer do-not-call database. This may include reorganization and integration of files such as the state mandated lists with the individual lists 94. The control computer database 28 and 29 are replaced with the data from the updating database 70.

It is understood that the present embodiments described above are to be considered as illustrative and not restrictive. It will be obvious to those skilled in the art to make various changes, alterations and modifications to the invention described herein. For example, while particular lists have been discussed in the body of this disclosure, other lists may be included or the databases may comprise entirely different lists than those set forth in the specification. The lists are to be considered illustrative and not restrictive. To the extent that these variations, modifications and alterations depart from the scope and spirit of the appended claims, they are intended to be encompassed therein.

The claims are:

1. A method for blocking outgoing telephone calls for a number of companies in accordance with one or more do-not-call lists comprising the steps of:

reviewing each outgoing telephone call to a telephone switch at a primary switch cluster of a telephone carrier to determine if the telephone call was made from a telephone subject to call blocking review;

holding calls subject to call blocking review while forwarding the origination/destination pair information corresponding to the originating telephone number or AuthCode and the destination telephone number to a control computer;

comparing the destination number to one or more lists of blocked telephone numbers, said lists having information relevant to more than one company; and depending only on whether the origination/destination pair information appears on one or more of the lists, either blocking the telephone call at the switch or completing the call.

2. A method according to claim 1 wherein each telephone number or AuthCode corresponding to an originating telephone placing a call subject to blocking review has a code associated with said number or AuthCode and the numbers on said list or lists being associated with said code so that a telephone number appearing on a do-not-call list will only block a call from a phone having the associated code.

3. A method according to claim 2 wherein the list or lists contain information for two or more groups of telephones from which call originate, each group with different identification codes.

4. A method according to claim 3 wherein one of the lists is a list of blocked numbers compiled by an originating telephone group.

5. A method according to claim 2 wherein one of the lists is a list of blocked numbers compiled by other than the originating telephone group.

6. A method according to claim 5 where a destination appears on a list compiled by other than the originating telephone group, the number may then be compared with an override list which would allow the call to be placed despite appearing on said list compiled by other than the caller.

7. A method according to claim 6 wherein the destination numbers on the override list are tagged by originating caller code and the do-not-call list compiled by other than a group is only overridden when the override number is tagged with the number of the originating caller code.

8. A method according to claim 7 wherein the do-not-call lists and the override lists for a group are updated by the caller through use of the Internet.

9. A method according to claim 1 wherein said telephone switch is a switch which accepts calls from a number of telephones only some of which are subject to call blocking review.

10. A method according to claim 9 wherein said telephone switch is a public switch operated by a common carrier.

* * * * *